Patented Dec. 13, 1932

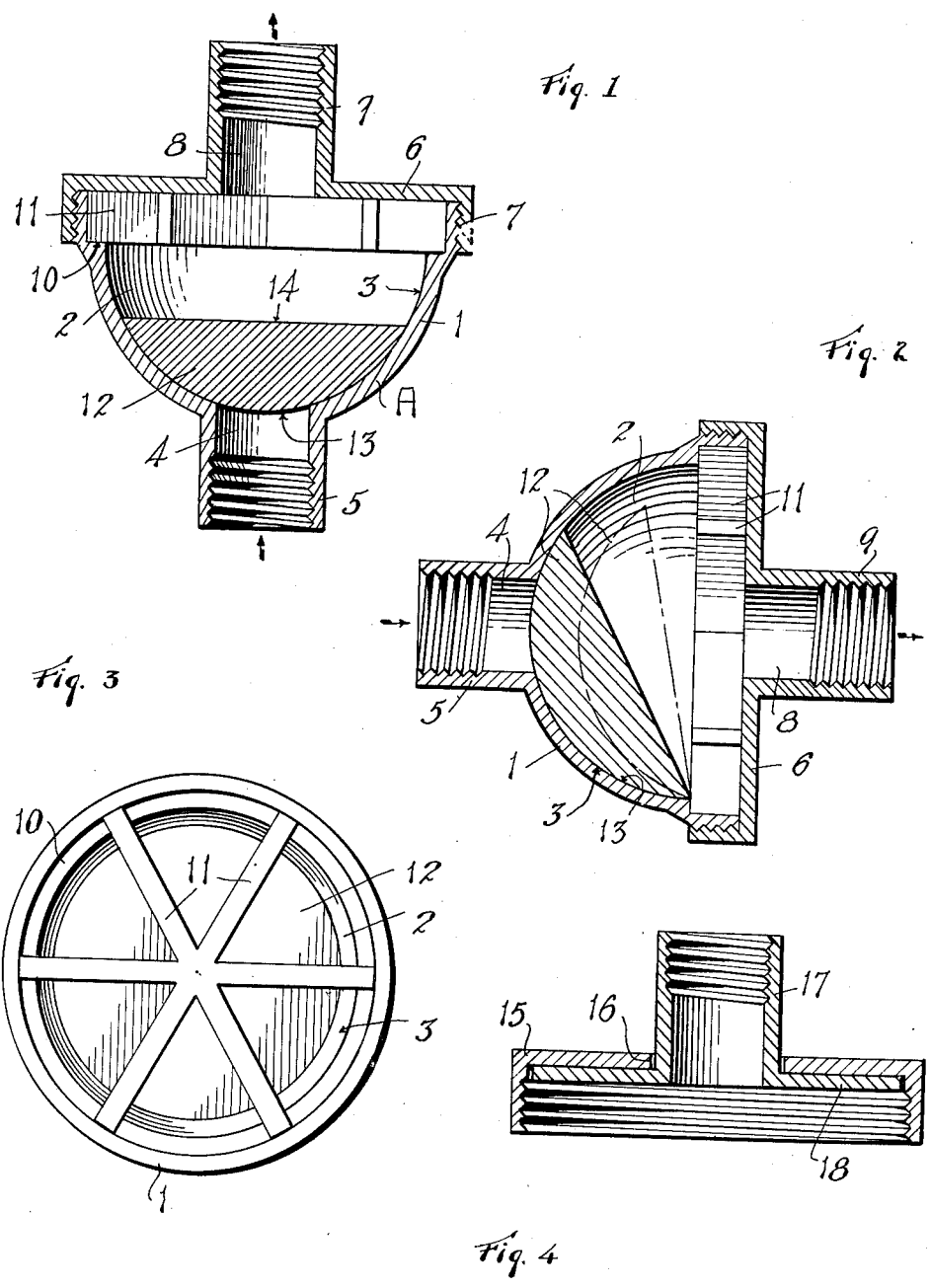

1,890,513

UNITED STATES PATENT OFFICE

GEORGE M. KESSLER, OF MADISON, NEW JERSEY

CHECK VALVE

Application filed March 4, 1931. Serial No. 519,916.

This invention relates in general to check valves for preventing return or backward flow of fluids or semifluids under pressure.

One object of the invention is to provide a check valve embodying novel and improved features of construction which shall be capable of withstanding hard usage under severe conditions and yet shall comprise a small number of simple parts.

Another object is to provide a check valve including a novel and improved construction and combination of a casing and a valve disk, which shall be positive in operation and wherein the valve disk or valve body shall be freely movable in all directions relatively to its seat, and wherein said disk shall be capable of moving freely to its seat by action of gravity with the valve arranged in either vertical or horizontal position but shall be limited in its movement in the other direction.

Other objects are to provide such a check valve including a cup-shaped casing having a segmentally spherical concave seat formed with an inlet opening, a valve disk in the form of a segment of a solid sphere of the same radius as the valve seat, the valve disk being mounted so as to have a sliding movement on the valve seat and to move bodily to and from the valve seat, a cap for said casing having an outlet opening, and a grid clamped between said cap and said casing, whereby the valve disk shall be capable of positively and completely closing the inlet opening of the valve against back pressure but is prevented from closing said outlet opening, and by its movement relative to the valve seat may clear the valve seat of foreign matter and ensure even wearing of the valve disk and valve seat; and to obtain other advantages and results as will be brought out by the following description.

Referring to the accompanying drawing, in which corresponding and like parts are designated throughout the several views by the same reference characters, Figure 1 is a vertical longitudinal sectional view through a check valve embodying my invention, showing the same in vertical position, i. e., to prevent downward return flow therethrough;

Figure 2 is a similar view showing the valve in horizontal position;

Figure 3 is a top plan view of the valve casing with the cap removed, and

Figure 4 is a transverse vertical sectional view through a modified form of the cap.

Specifically describing the illustrated embodiment of the invention, the valve includes a casing A which comprises a cup-shaped body part 1 having a valve chamber 2 therein formed with a segmentally spherical concave inner wall 3. As shown, this chamber is substantially hemispherical. Substantially centrally of the inner wall 3 of the chamber, the casing is formed with an inlet opening 4 which may be formed in an integral threaded nipple 5 for connecting the body 1 to a pipe or tube. The side of the valve chamber 2 opposite the inlet opening 3 is closed by a cap 6 which is screw threaded on the body 1, as at 7, and has an outlet opening 8 in substantial axial alinement with the inlet opening 4. This outlet opening is preferably formed in a nipple 9 formed integral with the cap 6. The inner wall of the valve chamber 2 is also provided with an annular shoulder 10, the plane of which is substantially parallel to the plane forming the base of the spherical segment of the wall 3, and seated upon the shoulder and clamped between it and the cap is a grid or spider 11.

Within the valve chamber and between the grid 11 and the concave inner wall 3 is arranged a valve disk 12 which is in the form of a segment of a sphere, having a spherically curved surface 13 of the same radius as the spherically curved wall 3 of the valve casing, and a flat or plane surface 14 of a diameter less than the diameter of the plane of the spherical segment of which the inner wall 3 forms a part, whereby a passage between the inner wall of the casing and the valve disk for the flow of fluid through the casing is provided. In other words, the inner wall 3 of the casing constitutes a segment of a hollow sphere, while the valve disk 12 constitutes a smaller segment of a solid sphere of the same radius as the sphere of which the surface 3 forms a part.

When the valve is to be used in a vertical pipe line, it is positioned as shown in Figure 1, with the inlet opening 4 lowermost. In this position of the valve, the valve disk 12 contacts with or seats upon the concave inner wall 3 by action of gravity so as to close the inlet opening 4 against return flow through the casing. The incoming fluid under pressure may raise the valve disk from its seat and pass around the valve disk through the casing to the outlet opening 8. The grid 11 holds the valve disk in spaced relation to the outlet opening so that the latter cannot become closed by the valve disk. During operation of the valve, the disk may slide relatively to the concave seat 3 and move bodily therefrom, and during this movement, the valve disk scrapes the valve seat clear of any foreign matter and prevents corrosion of both the seat and the disk. Furthermore, such movement of the valve disk ensures even wear of both disk and the seat, and the large spherical contacting surfaces of the seat and disk ensure positive and complete closing of the inlet opening against return flow under extremely high or low pressures.

When the valve is to be used in a horizontal pipe line, it is positioned as shown in Figure 2 of the drawing. Here the valve disk slides downwardly on the valve seat until its edge strikes the grid 11, but the spherical surfaces of the disk and valve seat accurately contact so as to positively close the inlet opening against return pressure. In this connection, it should be noted that the relative sizes of the spherical seat 3 and spherical surface 13 of the disk are such that the inlet opening is always closed by the disk under return pressure through the valve; in other words, sliding movement of the disk toward a horizontal position is limited so that the valve disk cannot uncover the inlet opening. In operation of the valve in this position, the inlet pressure swings the valve disk away from the inlet opening upon the lower portion of the edge of the disk, as shown by dot and dash lines in Figure 2, but the disk is free to move in the valve chamber in all directions so as to adjust itself to the seat.

With this construction, it will be observed that the valve is much more effective than would be a ball check valve having a ball of the same diameter as the spherical surfaces 2 and 13, and at the same time can be made much smaller than could a ball check. It has the additional advantages that the valve disk 12 may be unseated by less inlet pressure; the disk may have a sliding action relative to the valve seat which would not be possible with a ball check; and the valve may be used in both horizontal and vertical positions with the valve disk closing by action of gravity and without the necessity of springs and the like. The valve can be easily and quickly assembled and disassembled, and involves no hinges or levers such as found in known flap valves and the like.

Where it is desired to combine a union coupling with the valve, the cap may be modified as shown in Figure 4 of the drawing. Here the cap 15 has a central opening 16 through which projects a nipple 17 integral with a plate 18 loosely arranged within the cap and adapted to be clamped between the cap and the end of the body. With such a construction, the nipple 17 may be secured upon a pipe, and the valve body may be connected and disconnected by merely screwing or unscrewing the cap 15 from the body, just as the usual type of union coupling is operated.

While I have shown and described the invention as embodied in certain details of construction, it should be understood that this is primarily for the purpose of illustrating the principles of the invention and that many modifications and changes may be made in the valve structure without departing from the spirit or scope of the invention.

Having thus described the invention, what I claim is:

1. A check valve comprising a casing having a cup-shaped body part having a portion of its inner wall segmentally spherically concave and an inlet opening through said portion of said wall, a cap closing the open end of said body part having an outlet opening, a valve disk loosely mounted in said chamber and having a segmentally spherical surface of the same radius as said concave portion to overlie said inlet opening with its spherical surface to contact with said concave portion, an interior annular shoulder at the open end of said body part, and a grid clamped between said shoulder and said cap to limit sliding and bodily movement of said disk relative to said concave portion and prevent said disk from closing said outlet opening.

2. A check valve comprising a casing having a cup-shaped body part having a portion of its inner wall segmentally spherically concave and an inlet opening through said portion of said wall, a cap closing the open end of said body part having an outlet opening, a valve disk loosely mounted in said chamber and having a segmentally spherical surface of the same radius as said concave portion to overlie said inlet opening with its spherical surface to contact with said concave portion, and a grid clamped between said body part and said cap to limit sliding and bodily movement of said disk relative to said concave portion and prevent said disk from closing said outlet opening.

GEORGE M. KESSLER.